Oct. 11, 1960

O. K. KELLEY 2,955,683

LIQUID COOLED DISC BRAKE

Filed Nov. 6, 1958

INVENTOR.
Oliver K. Kelley
BY
D.C. Staley
HIS ATTORNEY

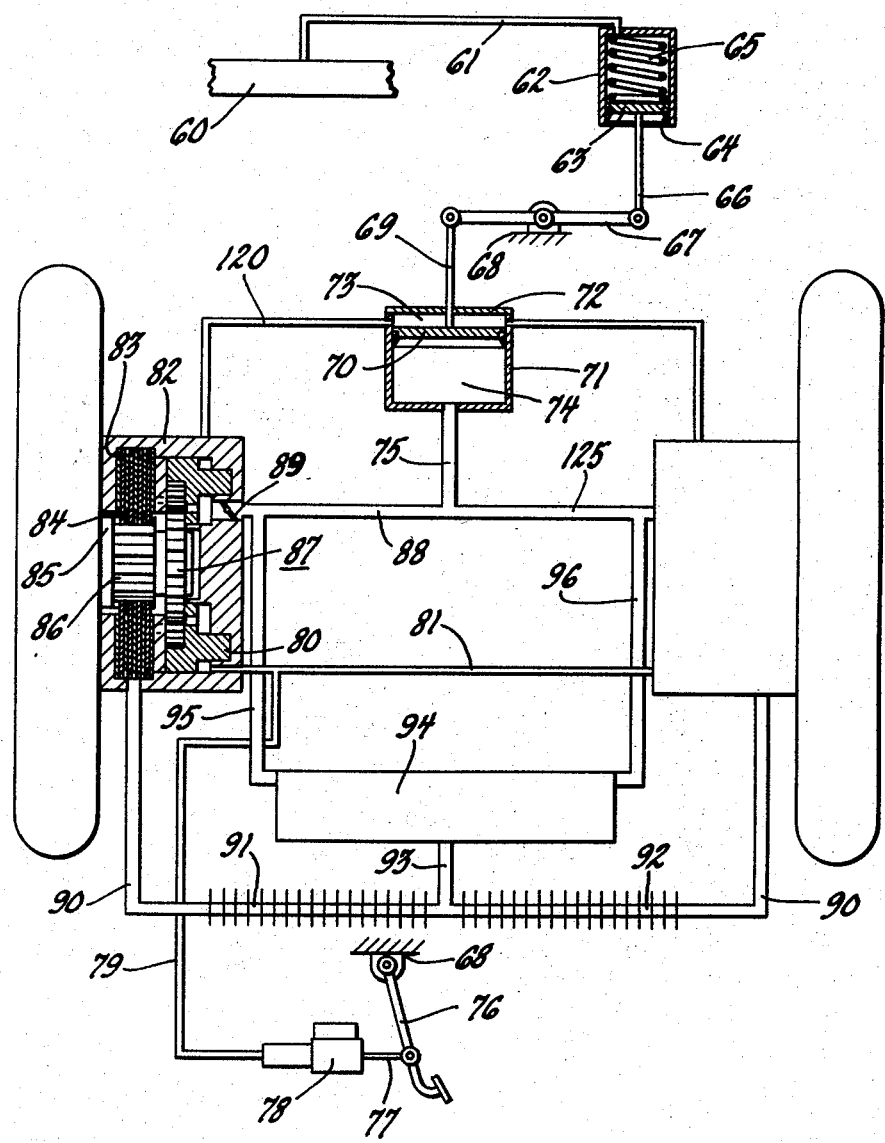

Oct. 11, 1960    O. K. KELLEY    2,955,683
LIQUID COOLED DISC BRAKE
Filed Nov. 6, 1958    3 Sheets-Sheet 3

INVENTOR.
Oliver K. Kelley
BY D. C. Staley
HIS ATTORNEY

United States Patent Office 2,955,683
Patented Oct. 11, 1960

2,955,683

LIQUID COOLED DISC BRAKE

Oliver K. Kelley, Bloomfield Hills, Mich., assignor to General Motors Corporation, Detroit, Mich., a corporation of Delaware Filed Nov. 6, 1958, Ser. No. 772,217

7 Claims. (Cl. 188—72)

This invention relates to a fluid cooled disc brake and more particularly to a low drag fluid cooled disc brake.

A fluid cooled disc brake has the inherent disadvantage of having a high drag characteristic when being rotated at a high speed when the brakes are not actuated. This drag is primarily due to the friction between the rotating and stationary discs caused by the fluid present within the brake housing and contacting both the rotating and stationary discs. The friction is a fluid friction or fluid shear as the rotating discs are rotated in relation to the stationary discs.

In the event that the braking structure includes a fluid pump, additional drag is created within the pump itself. The rotating of the pump creates considerable turbulence which produces an increasing drag as the speed of the vehicle is increased. A considerable amount of the drag could be eliminated by evacuating the fluid pumps and the liquid cooled disc brakes.

It is an object of this invention to provide a means to eliminate drag created by the fluid present between the rotating and stationary discs of fluid cooled disc brakes.

It is another object of this invention to provide a means to eliminate the drag within the pumping structure of the brake cooling pumps.

It is a further object of this invention to provide means for creating circulation of the cooling fluid within the cooling system responsive to movement of the vehicle.

It is a further object of this invention to provide an air cooling means for the fluid within the cooling system.

It is a further object of this invention to provide fluid evacuation control means for the disc brake and the cooling fluid pump in response to the vacuum in the engine manifold and the means for actuating of the vehicle brakes.

The objects of this invention are accomplished by providing a fluid actuated vehicle disc brake. This brake may be provided on either two or four of the wheels. The fluid actuating system operates on an annular hydraulic wheel cylinder with a valve operating piston extending into this hydraulic cylinder chamber. The valve operating piston operates in response to the pressure within the hydraulic cylinder and opens a valve within the cooling fluid system.

The cooling fluid system has fluid pumps contained therein which are directly connected to the vehicle wheel shaft. A cooling system also contains a chamber which has radiating fins on its external portion for cooling of the heated brake fluid. This chamber also feeds into a reservoir for the cooled brake fluid which in turn feeds back into the fluid pumps for recirculation.

An evacuation control valve which operates in response to the pressure of the brake cooling fluid in the hydraulic wheel cylinder is placed adjacent the cooling fluid inlet port to the braking structure. This valve is normally in a closed position and opens upon actuation of the brakes.

The evacuating cylinder evacuates the cooling fluid system when in operation. The evacuating cylinder also is provided with an air chamber which feeds into the inlet side of the fluid pumps as the fluid is evacuated from the outlet side of the fluid cooling pumps and vehicle disc brake. The fluid circulates through the system until it enters the evacuating cylinder.

The evacuating cylinder operates through a lever arrangement which is directly connected to a vacuum cylinder which operates in response to the engine vacuum. The fluid cooling system is filled upon actuating of the fluid cooled brakes and the evacuating cylinder automatically forces fluid into the braking structure when a high vacuum is present in the engine manifold. This brake structure is designed to evacuate at high speeds and to cool the brakes upon actuation.

Further objects and advantages of the present invention will be apparent from the following description, reference being had to the accompanying drawing, wherein a preferred embodiment of the present invention is clearly shown.

Figure 3 is a schematic diagram showing a cross sectional view of one of the vehicle disc brakes and pumps in a limited form. The brake structure as disclosed herein is not complete but only to show its operation in conjunction with the evacuating means in the fluid cooling system. This view illustrates the evacuating system and control for the fluid cooling system operating in conjunction with two wheel brakes.

Figure 4:
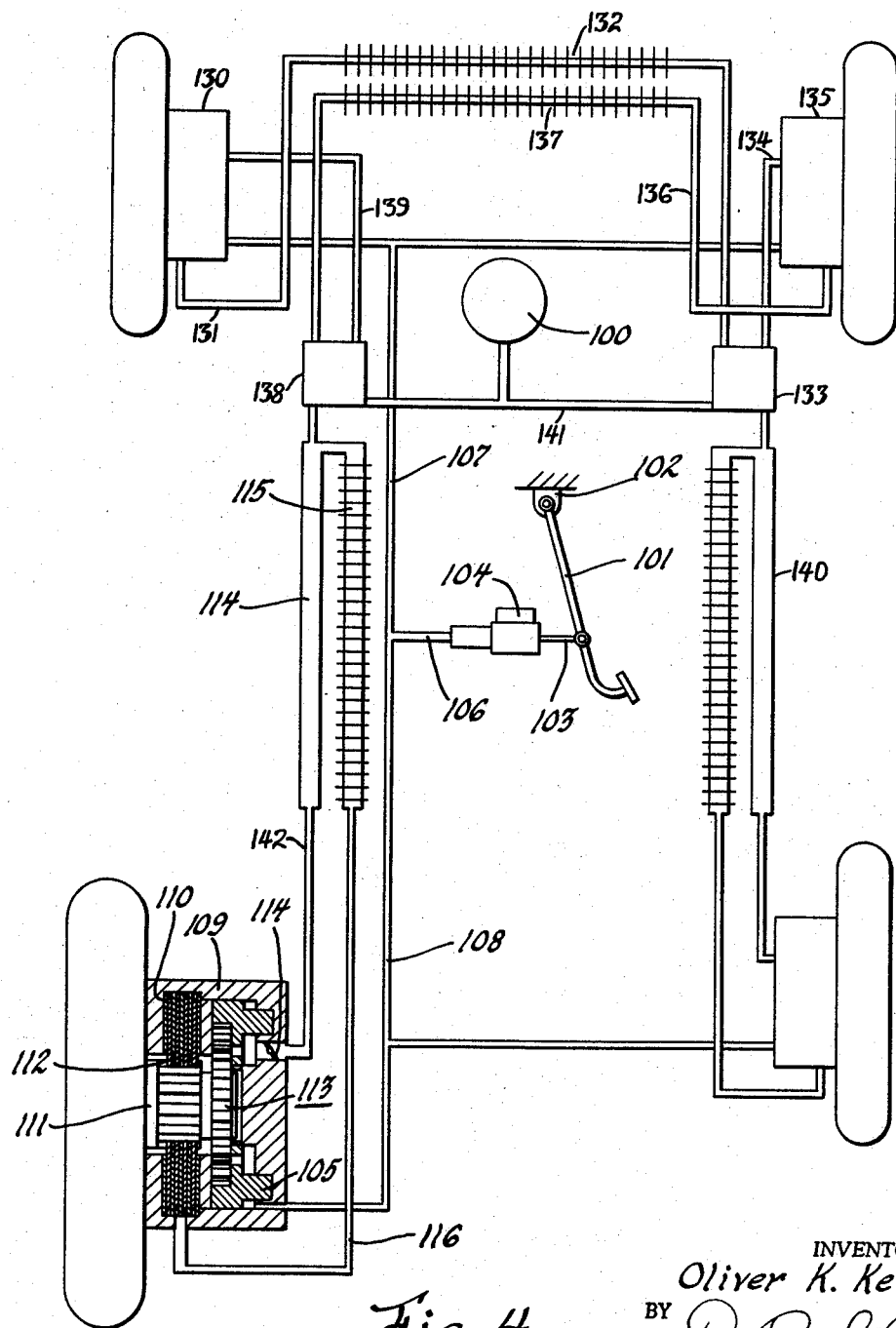

Figure 4 is a schematic diagram similar to that of Figure 3. The evacuating means is not shown in as much detail as in Figure 3 and the system is operating in conjunction with a four wheel braking system.

Figure 2:
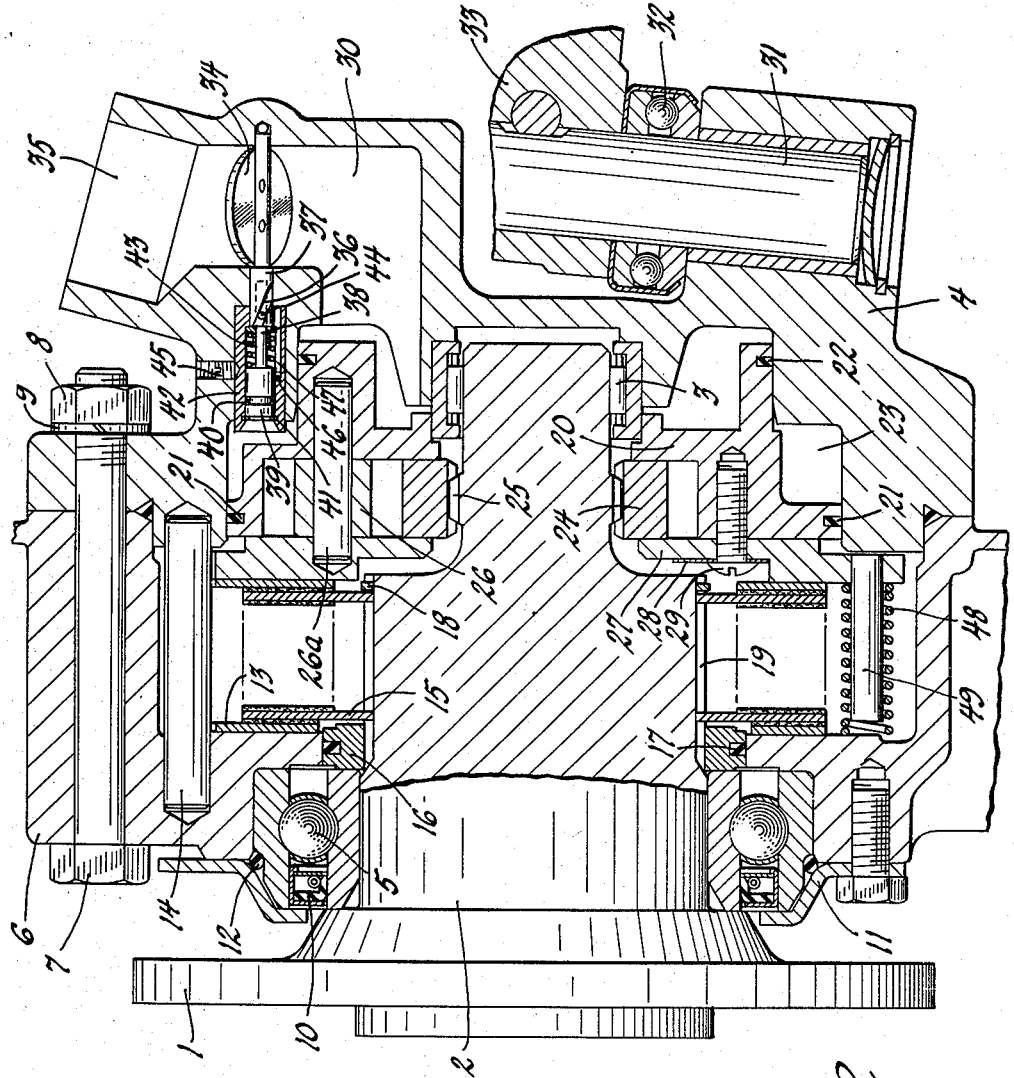
Figure 2 is a cross sectional view of the vehicle disc brake and the cooling fluid pump and the pressure responsive valve in the cooling system. This view is taken from line 2—2 of Figure 1.
Figure 1:
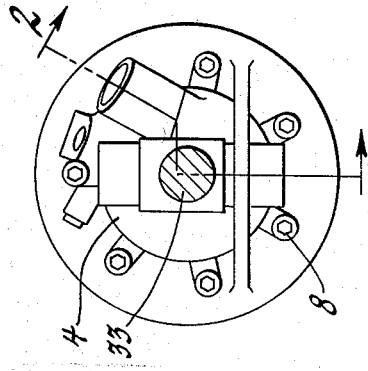
Figure 1 is an end view taken from the inboard side of the vehicle disc brake. This view shows the means for mounting the end plate and external housing of the vehicle cooling pump and braking structure.

Figure 1 is an end view of the braking structure taken from the inboard side of the vehicle brakes. The view is primarily to show where the cross sectional view of Figure 2 is taken. A more elaborate view of the various parts of this braking structure is shown in a copending patent application, Serial No. 772,229, filed November 6, 1958, and of the same assignee. This copending application provides the additional views which may aid in visualizing the operation of the cooling pump and disc brakes.

Figure 2 illustrates the cross sectional view of vehicle disc brake and the fluid cooling pump operating directly from the vehicle wheel shaft. The vehicle wheel is attached to the wheel flange 1 which is directly connected to the shaft 2. The shaft 2 extends inboard where the reduced size of the shaft is rotatably mounted in roller bearing assembly 3. The roller bearing assembly is mounted within the wheel mounting bracket which also serves as the hydraulic wheel cylinder. The wheel shaft 2 is also rotatably mounted within another bearing assembly 5 which is mounted within the inner periphery of the brake housing 6. The brake housing 6 is bonded to the wheel mounting plate 4 by means of bolts 7, nuts 8 and washers 9. The outboard side of the ball bearing assembly 5 is provided with a seal assembly 10 which is mounted between the inner and the outer race of the ball bearing assembly 5. A cover plate 11 is also disposed on the outboard side of the ball bearing assembly 5 and the brake housing 6. A seal 12 is provided on the inboard side of cover plate 11 between the outer race of the ball bearing assembly 5 and the brake housing 6.

The stationary discs 13 are mounted on the pins 14. Pins 14 are placed in holes of the wheel mounting bracket 4 and the brake housing 6 and angularly spaced within the brake housing to serve as a mounting means for the stator discs. The rotating discs 15 are mounted for engagement with the stator discs and are alternately placed between the stator discs 13. The rotating discs 15 are spline connected to a spline portion of shaft 2. A spacing member 16 is mounted on the outboard side of the rotating discs 15 and on the inboard side of the ball bearing assembly 5. The spacing member 16 is also provided with a seal 17 which fits around the inner periphery of the brake housing 6. The spacing member 16 fits around the outer periphery of the shaft 2. On the inboard side of the rotating discs a snap ring 18 is placed to maintain a limited position for the rotating discs 15 of the spline portion 19 of shaft 2.

The hydraulic wheel piston 20 is mounted on the inner periphery of the outboard side of the wheel mounting bracket 4. The hydraulic wheel piston is also provided with a seal 21 and seal 22 which confine the fluid within the actuating chamber 23 of the wheel mounting bracket 4 which operates as the hydraulic wheel cylinder. The wheel piston 20 serves the additional function of operating as a housing means for the fluid cooling pump.

The fluid cooling pump comprises a sun gear 24 which is spline connected to the spline portion 25 of the wheel shaft 2. The sun gear rotates as the shaft 2 rotates. The odd number of planetary gears 26 are spaced within the wheel hydraulic piston 20 which engage the sun gear 24. These planetary gears are mounted on pins 26A which in turn are mounted within the hydraulic piston 20 and the cover plate 27. The cover plate 27 is mounted against the outboard side of the hydraulic piston 20. The cover plate 27 is held in position by means of washers 28 and screws 29. The cover plate 27 also operates as the pressure plate for actuating the discs of the disc brake. The hydraulic piston 20 and the cover plate 27 are nonrotatively mounted within the wheel mounting bracket 4. The hydraulic piston 20 is provided with inlet holes to permit passage of fluid from chamber 30 into the fluid pump. The cover plate 27 is also provided with outlet passages to allow fluid to flow into the inner periphery of the brake discs. The fluid passes readily outward through grooves in the brake discs and leaves the braking structure through a conduit which leads to the chamber for cooling the fluid.

The structure of the fluid cooling pump is shown in more detail in the copending application which was previously mentioned. It is also pointed out that a check valve is provided in the hydraulic piston 20 and the cover plate 27. This check valve permits passage of cooling fluid through the hydraulic piston 20 and the pumping structure when the brakes are actuated. This is to eliminate excess pressure within the braking structure which may hinder the actuation of the brakes.

The braking structure shown in Figure 2 is that of a front wheel brake. The king pin 31 is shown on the inboard side of the wheel mounting bracket 4. A thrust bearing assembly 32 is positioned between the wheel mounting bracket 4 and the vehicle chassis 33.

The pressure of the fluid within the actuating chamber 23 actuates a butterfly valve 34 which is mounted within the inlet passage 35 of the cooling fluid system. The butterfly valve is pivotally mounted within the passage 35 and normally closes off this passage. The outboard end of the butterfly valve has a sleeve portion with a helical groove 36 on its outboard portion. The outboard end of the butterfly valve 37 is provided with a sleeve for receiving a cylindrical portion 38 of piston 39. The cylindrical portion 38 extends outboard to connect the piston 39. The piston 39 is provided with a seal 40 to prevent leakage of the brake actuating fluid into the cooling fluid system. A snap ring 41 is also provided to retain the piston 39 within the sleeve 42. A spring 43 biases the piston 39 to its outboard position which in turn closes the butterfly valve as the pin 44 operates within the helical groove 36. The sleeve 42 is retained in the nonrotating position by a set screw 45 which threadedly engages the wheel mounting bracket 4 and also a portion of the external side of sleeve 42.

The piston 39 is also retained in a nonrotatively position by means of a lug 46 which moves axially within the groove 47. The groove 47 is cut axially within the inner periphery of sleeve 42.

The hydraulic piston 20 is provided with return springs 48 which are spaced at intervals of about the outboard side of the radial flange of cover plate 27, and concentrically around pins 49.

Figure 3 is the schematic diagram of the fluid braking system operating in conjunction with two wheel brakes. The evacuating device is also shown directly connected with the fluid cooling system. The evacuating device operates in response to the engine vacuum. The manifold of the vehicle engine is shown at 60. Conduit means 61 connect the manifold to the vacuum cylinder 62. A piston 63 is operatively positioned within the cylinder 62 and provided with a seal 64. The piston 63 moves axially in opposition to spring 65. Piston 63 is also directly connected to a lever 67 by means of rod 66, rod 66 being pivotally connected to lever 67. Lever 67 pivots on a point of the chassis 68, the opposite end of lever 67 pivotally connects a rod 69 which is directly connected to a piston 70. Piston 70 operates within the evacuating cylinder 71. Cylinder 71 is provided with a cover plate 72 on its upper end, thereby providing a chamber 73 above the piston 70 and a chamber 74 below the piston 70. The evacuating cylinder 71 is directly connected to the fluid cooling system by means of a conduit 75.

The fluid actuating system comprises a foot pedal 76 for actuating the brakes mounted on the chassis 68 of the vehicle. Lever 76 is connected to the push rod 77 which operates the piston within the hydraulic master cylinder 78. Upon pressurization of fluid within the master cylinder 78 and conduit 79 the hydraulic wheel cylinder 80 in the vehicle braking structure is actuated.

The braking structure is contained within the housing 82. The stator discs 83 are connected to the housing 82. The rotating discs 84 are directly connected to the wheel shaft 85 at its spline portion 86. The shaft 85 is also directly connected to the pump 87 which is also mounted within the hydraulic wheel piston 80.

The fluid cooling system comprises the inlet conduit 88 which is closed by the butterfly valve 89. The butterfly valve 89 is responsive to the actuating pressure within the hydraulic wheel actuating chamber. When the butterfly valve 89 is open, the cooling fluid is allowed to directly pass to the fluid cooling pump 87. The fluid cooling pump pumps the fluid directly to the inner periphery of the brake discs. The cooling fluid then passes readily outward until it is discharged into the conduits 90 from which it feeds into the radiating chambers 91 and 92. The radiating chambers 91 and 92 are connected to a conduit 93 to a reservoir 94. Conduits 95 and 96 provide a return for the cooling fluid from the reservoir 94 to the inlet side of the braking structure.

Figure 4 is a similar schematic diagram to that of Figure 3 except that the evacuating device is generally indicated by a cylinder 100. Figure 4 also illustrates this invention in conjunction with the four wheel braking system. The actuating system for the vehicle fluid brakes comprises a brake lever 101 pivotally connected to the chassis 102. The brake lever 101 pivotally connects the push rod 103 which operates the piston within the master cylinder 104. The master cylinder is directly connected to the hydraulic wheel piston 105 of the vehicle brakes by means of conduits 106, 107 and 108. A cross section of braking structure is shown and also one of the wheels. This structure comprises a braking housing 109 directly connected to stator discs 110. The shaft 111 is directly connected to the rotating discs 112. The shaft 111 is also connected to the gear pump 113. Gear pump 113 pumps the cooling fluid of the system when the butterfly valve 114 is open. A reservoir is provided for each wheel. The reservoir 114 is provided on the outlet end of the cooling chamber 115 which is directly connected to the wheel brake just described by means of conduit 116. It will be noted that the reservoir for each wheel is provided on the outlet end of the radiating and cooling chamber of the brake cooling fluid.

The cooling system as shown in Figure 4 includes a fluid cooling pump operating in each of the plurality of vehicle wheels. The fluid pump 113 is of the same type as is employed in each of the brakes. The pump in the other wheels not shown in cross section operate in the same manner as that shown for the brake 109. The cooling fluid of the brake 109 circulates through the fluid conduit 116 and the cooling chamber 115 and the reservoir 114 and returns to the opposite side of the brake through the fluid pump 113. The action of the other brakes is in a similar manner. The brake 130 is provided with a fluid pump for circulating the fluid through the brakes and then through the conduit 131 and the cooling chamber 132 to the reservoir 133. The fluid from the reservoir 133 is circulated through the conduit 134 to the opposite side of the motor vehicle and through the brake 135. The fluid is circulated through brake 135 by a pump operating within the brake 135. The fluid then circulates through the conduit 136 to the cooling chamber 137 and the reservoir 138. The fluid in the reservoir 138 returns through the conduit 139 to the brake 130. In this manner the fluid is circulated through both of the front wheel brakes and both reservoirs 133 and 138. The reservoirs 133 and 138, 114 and 140 are all connected to the evacuating cylinder 100 through the conduit 141. As the evacuating cylinder 100 evacuates the fluid cooling system the fluid is drawn from all four reservoirs simultaneously thereby evacuating all the four wheel brakes.

This invention operates in the following manner. The fluid cooling pumps as indicated by 87 of Figure 3 are in constant rotation at all times when the wheels are rotated being they are directly connected to the wheels by the wheel shaft. The butterfly valve 89 closes off the fluid inlet passage to the fluid cooling pumps 87 as the brakes are inactivated. As the wheels are rotated the butterfly valve is closed and the pump evacuates the pumping chamber and the braking chamber. The fluid is forced through the cooling chambers 91 and 92. The evacuation of the pumping chamber and the braking chamber is dependent upon the speed of the vehicle. In other words, the more rapid the speed, the more complete the evacuation of the pumps and brake.

The vehicle engine produces a vacuum within the engine manifold 60 when the engine is in operation. A maximum vacuum will be created in the manifold when the engine is operating under an idling condition and a lesser vacuum is produced. When the engine is operating under a full throttle with the manifold 60 being directly connected to the vacuum cylinders 62. The effective vacuum in the manifold is, therefore, transmitted to the vacuum cylinder 62. For a low vacuum within the manifold 60 and the vacuum cylinder 62, the spring 65 will retain the piston 63 in the lower portion of cylinder 62. In this position, the evacuating piston 70 is in the upper portion of the evacuating cylinder 71. This forces any air which may be present in the chamber 73 of cylinder 71 above piston 70 through the conduit 120 into the input side of the cooling pump 87. This permits the fluid which may have been present in the pumping chamber and the braking chamber to pass outward through conduit 90. No fluid at this time is permitted to enter through conduit 88 as the butterfly valve 89 is closed.

At this point, the pumping of fluid cooling pump 87 and the centrifugal force within the disc braking structure will force the fluid through conduit 90 into the heat radiating or cooling chamber 91. The fluid will further pass into the reservoir 94 and then upward to the point adjacent to the butterfly valve 89.

When a vacuum is created on the low side of chamber 74 of piston 70 of the evacuating cylinder 71, the fluid within the cooling system passes by the butterfly valve 89 through conduit 88 and upward through conduits 75 into the chamber 74 of the evacuating cylinder 71. Under these conditions, the fluid cooling pumps and the disc brakes operate under a low drag condition because the fluid has been evacuated and the internal fluid friction has been eliminated. The structure is designed to provide complete evacuation at speeds above sixty miles an hour.

When the vehicle is being operated at a speed which is great enough to evacuate the fluid cooling pumps and the disc brake structure minimum drag is present. As the operator decelerates the car he releases the foot from the accelerator thereby placing the engine in an idling state of operation. This produces a high vacuum within the manifold and also the vacuum cylinder 62. The vacuum within cylinder 62 actuates the lever 67 thereby creating pressure within the evacuating cylinder 71. The fluid within cylinder 71 is forced into conduits 75, 88, 95, 96 and 125, and then into the reservoir 94.

When the operator actuates the vehicle brakes, a pressure is created within the fluid actuating chamber 23 adjacent to the hydraulic piston 20. The pressure within this chamber moves the piston 39 axially inboard within the braking structure. The movement of piston 39 creates a rotating torque on pin 44 within slot 36. The force on slot 36 of sleeve 37 rotates the butterfly valve 34, thereby opening the passage 30. As the passage 30 is opened, fluid is permitted to enter on the input side of the cooling pump 87.

The evacuating piston 70 moves downward forcing the fluid out of the chamber 74 and into the low side of the fluid cooling pumps. A vacuum is created on the upper portion on the input side of the fluid pumps. This vacuum is drawn through the conduit 120 on the top side of the evacuating piston 70. The fluid within the chamber 74 is then completely expelled into the conduits leading to the fluid cooling pumps. This action completely fills the fluid cooling pumps and the disc brake. Any air which may entrain within the pumping and braking structure is carried through the fluid system and back into the upper portion of the pumping structure on the fluid input side of the fluid cooling pump 87.

The fluid cooling pump continues to circulate the fluid within the system through the braking structure and then through the cooling chamber 91 back to the reservoir 94. This system provides a cooling means for the fluid within the system and also a reservoir to supply sufficient fluid for cooling of the vehicle disc brakes.

The cycle of the brake cooling and evacuation is completed at this point. As the brakes again are released, the piston 39 moves actually outboard in response to spring 43. This action produces a counter-torque on the pin 44, thereby closing the butterfly valve 34 within chamber 30. As the accelerator is again depressed, the vacuum within the vacuum cylinder 62 decreases in relation to the vacuum of engine manifold 60. The spring 65 again being sufficiently strong to force piston 63 downward thereby creating a vacuum within chamber 74 of the evacuating cylinder 71. This action again forces air above the piston 70 into the low side of the fluid cooling pump 87.

This system provides for cooling of the fluid within the brake cooling system. The cooling means is provided by fins on the conduits leading from conduit 90 into the reservoir 94. As the fluid enters reservoir 94, it is cooled and remains in the reservoir until the evacuating piston 70 draws the fluid upward. The reservoirs are of a predetermined size in relation to the chamber 74 of the evacuating cylinder 71 that provide a definite relation between these two chambers 74 and 94. The fluid is either evacuated or placed within the reservoir 94 for cooling of the fluid disc brakes. In the above description of the operation, a single brake has been described. It is pointed out that all the brakes carried on the wheels of a vehicle are of a similar nature and operate in similar manner.

The operation of the fluid cooling system and evacuating means as illustrated in Figure 4 is in the following manner. As the brake pedal 101 is depressed the fluid within the brake actuating system is pressurized thereby opening the butterfly valve 114 in a similar manner to that described for the device of Figures 2 and 3. Pressurization of the fluid within the wheel cylinder opens the butterfly valve thereby permitting fluid to enter the input side of the fluid pumps 113. With an increase in vacuum as described in Figures 2 and 3 the fluid in the evacuating cylinder is forced downwardly forcing fluid into the reservoirs 114, 140, 133 and 138. With the fluid supply returning to the reservoirs it is immediately available on the input side of the fluid pumps within the braking structure. This, in turn, circulates the fluid through the plurality of vehicle brakes of the motor vehicle. So long as the motor vehicle brakes are actuated the fluid will circulate through the vehicle brakes.

As the brake pedal 101 is released the butterfly valve will return to its normally closed position thereby closing the passage 142 leading into the vehicle disc brake. The corresponding passages of the plurality of vehicle brakes will also be closed in a similar manner. With the butterfly valve closed and a decrease in vacuum the evacuating cylinder 100 will evacuate the reservoirs 114, 140, 133 and 138 in a similar manner to that described in Figures 2 and 3. With the rotation of the fluid pump and the closing of the butterfly valves 114 the plurality of vehicle brakes will then become evacuated and the fluid will be drawn into the evacuating cylinder 100. In this position the vehicle is in a normal operating position and the vacuum has returned to a sufficiently small value to permit the spring 65 to evacuate the cooling system.

While the embodiment of the present invention as herein disclosed constitutes a preferred form, it is to be understood that other forms might be adopted.

What is claimed is as follows:

1. A fluid brake cooling system comprising in combination vehicle disk brakes, vehicle wheels adjacent to said brakes, a hydraulic wheel cylinder for actuating each of said vehicle disk brakes, a control member for pressurizing fluid within a fluid displacement member, conduit means connecting said fluid displacement member with said hydraulic wheel cylinders, a fluid cooling system including a fluid pump connected to said wheel, a fluid cooling chamber and a reservoir chamber in said fluid cooling system, conduit means connecting said vehicle disk brake to provide a continuous circuit of a cooling fluid through said cooling chamber and said reservoir and said braking means, evacuating means connected to said fluid cooling system by a conduit means in communication with said brake through said reservoir, a vacuum operated cylinder in communication with an engine manifold, an evacuating cylinder with a piston connected by a lever arrangement to a piston in said vacuum cylinder, a valve means within said fluid cooling system on the input side of said fluid pump having a normally closed position thereby preventing fluid circulation in said cooling system and permitting evacuation of said disk brake and said pump by said evacuating means.

2. An evacuating system operating in conjunction with a fluid cooled brake comprising in combination, a vehicle disk brake, a vehicle wheel adjacent to said brake, a hydraulic cylinder for actuating said vehicle disk brake, control means for pressurizing fluid within the fluid displacement member, conduit means connecting said fluid displacement member with said hydraulic wheel cylinder, a fluid cooling system having a fluid cooling pump operating in response to the rotating of said vehicle wheel, a valve means on the input side of said fluid cooling pump operating in response to fluid pressure within said fluid wheel cylinder, cooling means in said fluid cooling system, reservoir means in said fluid cooling system, conduit means connecting said cooling chamber, and said reservoir with said vehicle disk brake, a fluid evacuating means connected by conduit means to said fluid cooling system adjacent said reservoir and adapted for operation in response to an engine manifold, said evacuating means operating to evacuate said fluid cooling system when said pressure responsive valve is closed.

3. An evacuating system operating in conjunction with a fluid cooled vehicle disk brake comprising in combination, a vehicle disk brake for controlling the rotation of vehicle wheels, a fluid cooling pump operating in response to the rotation of said vehicle wheel, a hydraulic wheel cylinder for actuating said vehicle disk brake, control means for pressurizing fluid within a fluid displacement member, conduit means connecting said fluid displacement member with said hydraulic wheel cylinder, a second piston operating within the actuating chamber of said fluid wheel cylinder in response to pressurization of fluid, said second piston connected to a valve means for providing rotation and opening of a valve means adjacent to the input side of said fluid cooling pump, said valve means normally biased to a closed position when said hydraulic wheel cylinder is in the inactive position, a fluid cooling system connecting said vehicle disk brake and said fluid cooling pumps and having fluid cooling and fluid reservoir means, a fluid evacuating means connected to said fluid cooling system for evacuation of said fluid cooling system, said evacuating means adapted for operating in response to the vacuum of said engine manifold.

4. An evacuating means operating in conjunction with a fluid cooled brake and comprising in combination, vehicle wheels operating in conjunction with fluid cooling pump, a vehicle disk brake adjacent to said vehicle wheels for controlling the rotation of said vehicle wheels, a fluid cooling brake system including an air cooling means for cooling external of said brakes in said fluid cooling system, a reservoir for storing the fluid within said fluid cooling system, conduit means for providing circulation of fluid through said vehicle disk brake and said air cooling means and said reservoir means, a hydraulic wheel cylinder with said vehicle disk brake and having a hydraulic fluid actuating chamber, a control means for pressurizing a hydraulic fluid within a fluid displacement member, conduit means connecting said fluid displacement member to said fluid actuating chamber within said hydraulic wheel cylinder, an auxiliary piston operating within an auxiliary cylinder adjacent to and in communication with the actuating pressure chamber of said hydraulic wheel cylinder, said auxiliary piston provided with a return spring and helical groove on its opposite end, said helical groove for receiving a pin connected to a butterfly valve, said butterfly valve disposed within a chamber on the inlet side of said fluid cooling pump, said butterfly valve having a normally closed position when said fluid actuating chamber of said hydraulic wheel cylinder is not pressurized, an evacuating means in connection with said fluid cooling system on the input side of said fluid cooling pump and adapted for evacuating said cooling system in response to a predetermined vacuum in an engine manifold and said butterfly valve biased to an open position when fluid within said actuating chamber is pressurized, thereby providing means for circulation of cooling fluid within said vehicle disk brake when said vehicle disk brakes are actuated.

5. An evacuating means operating in conjunction with fluid cooled disk brake comprising in combination, vehicle wheels with means for connection to a fluid cooling pump, a fluid cooled disk brake operating in conjunction with each of said wheels and for controlling the rotation of said wheel, a hydraulic wheel cylinder for actuating said fluid cooled disk brake, said hydraulic wheel cylinder having an actuating fluid chamber, means for pressurizing a fluid within a fluid displacement member, conduit means connecting said fluid displacement member with said actuating chamber in said hydraulic wheel cylinder, an auxiliary piston operating in response to the pressure within said actuating chamber within said hydraulic wheel cylinder, a butterfly valve mounted adjacent to the input side of said fluid cooling pump, said butterfly valve rotatably connected to said auxiliary fluid piston and adapted to open when said auxiliary piston is actuated, a fluid cooling system including a fluid cooling and reservoir means, said reservoir and cooling means connected by conduit means to said vehicle disk brake and said fluid cooling pumps, fluid evacuating means operating in response to a vacuum in the engine manifold, said fluid evacuating means comprising a vacuum operated piston operating in cooperation with a vacuum cylinder and connected to said engine vacuum by conduit means, a fluid evacuating piston operating in cooperation with an evacuating cylinder and directly connected through a lever to the fluid piston of said vacuum cylinder, said evacuating fluid piston provided with a double action evacuating and pressurizing means, one of the sides of said evacuated fluid piston for evacuating and pressurizing said fluid cooling system on the one side of said butterfly valve, the opposite side of said fluid evacuating piston providing a pressurizing and evacuating means on opposite side of said butterfly valve, thereby providing fluid evacuating means in said cooling system when said brakes are in actuated and a partial vacuum adjoining said pump and said braking structure when said brakes are activated.

6. A fluid evacuating means operating in conjunction with a fluid cooling disk brake comprising in combination vehicle wheels mechanically connected to fluid cooling pumps, vehicle disk brake operated in conjunction with each of said vehicle wheels, a hydraulic fluid cylinder having an hydraulic chamber, controlling means for pressurizing fluid within a fluid displacement member, conduit means connecting said fluid displacement member with said hydraulic fluid cylinder, a fluid cooling system for providing circulation of fluid through an air cooled chamber and a reservoir, an auxiliary piston operating within said fluid actuating chamber of said hydraulic wheel cylinder and provided with means for rotating a butterfly valve, said butterfly valve mounted adjacent to said fluid cooling pump and controlling the input of said pump, said butterfly valve in the closed position when said auxiliary piston is in the normal position, an evacuating means connected to said cooling fluid system, said evacuating means comprising a vacuum operating piston in cooperation with a cylinder operating in response to the vacuum of the engine manifold, said piston within said vacuum cylinder connected by a lever means to an evacuating fluid piston, said evacuating fluid piston operating within an evacuating fluid cylinder and having an operating chamber on both sides of said piston, the side opposite said lever means connection of said piston connected to the fluid cooling system on the one side of said butterfly valve thereby evacuating the reservoir of said fluid cooling system, an operating chamber on the opposite side of said fluid evacuating system for pressurizing or evacuating the opposite side of said butterfly valve adjacent to the input side of said fluid cooling pumps, said evacuating means thereby providing for evacuation of said fluid cooling pumps and said vehicle disk brakes when said fluid disk brakes are inactivated.

7. An evacuating means operating in conjunction with a fluid cooled disk brake comprising in combination, vehicle wheels each of said wheels connected to a fluid cooling pump, a vehicle disk brake for braking said wheel, said vehicle disk operated by a hydraulic fluid wheel cylinder having an actuating chamber, a manual control means for pressurizing fluid within a fluid displacement member, conduit means connecting said fluid displacement member with said actuating chamber of said hydraulic wheel cylinder, an auxiliary piston operating within said actuating chamber in said wheel cylinder, means connected to said auxiliary piston for transmitting a rotatable motion to a butterfly valve when said auxiliary piston is actuated, said butterfly valve positioned in a fluid cooling system adjacent to the input side of said fluid cooling pumps, said fluid cooling system connecting said vehicle disk brakes with said fluid cooling pump and having an air cooled chamber and a reservoir means, a fluid evacuating means connected to said fluid cooling system by a conduit means, said fluid evacuating means for providing operation in response to the vacuum of an engine manifold, said evacuating means having an evacuating cylinder and piston, said piston and cylinder having a fluid evacuating chamber on both sides of said evacuating piston, one side of said evacuating piston feeding into the low side of the fluid cooling pumps when said fluid cooling system is evacuated by the opposite side.

References Cited in the file of this patent

UNITED STATES PATENTS

| | | |
|---|---|---|
| 2,351,180 | Ash | June 13, 1944 |
| 2,355,484 | Teker | Aug. 8, 1944 |
| 2,496,497 | Russell | Feb. 7, 1950 |